Jan. 22, 1952 E. W. RIEGER Re. 23,456

APPARATUS FOR ELECTROCOATING STRIPLIKE MATERIAL

Original Filed Aug. 7, 1944 3 Sheets-Sheet 1

APPARATUS FOR ELECTROCOATING STRIPLIKE MATERIAL

Original Filed Aug. 7, 1944 3 Sheets-Sheet 2

INVENTOR
Ernest W. Rieger
by his attorney
James J. Shannon

APPARATUS FOR ELECTROCOATING STRIPLIKE MATERIAL
Original Filed Aug. 7, 1944 3 Sheets-Sheet 3
Fig. 4.
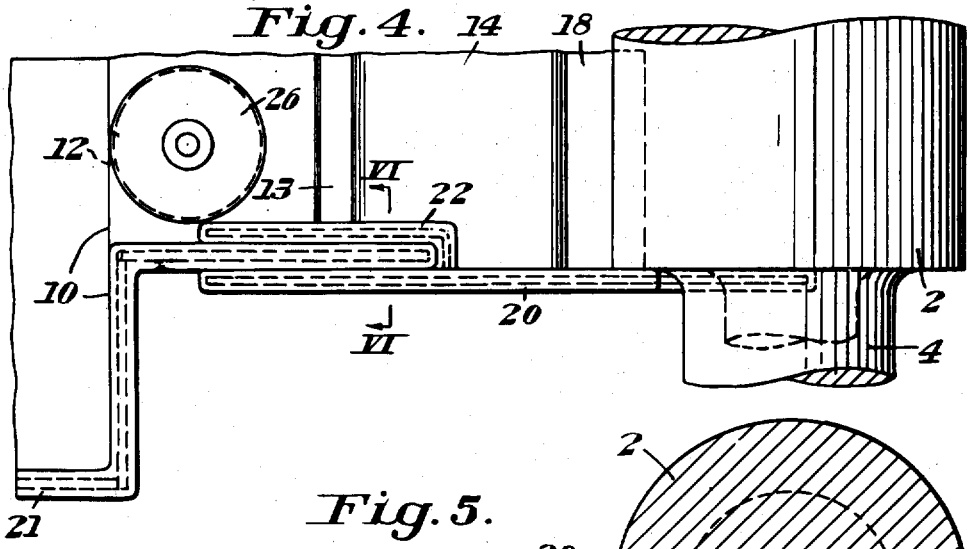
Fig. 5.
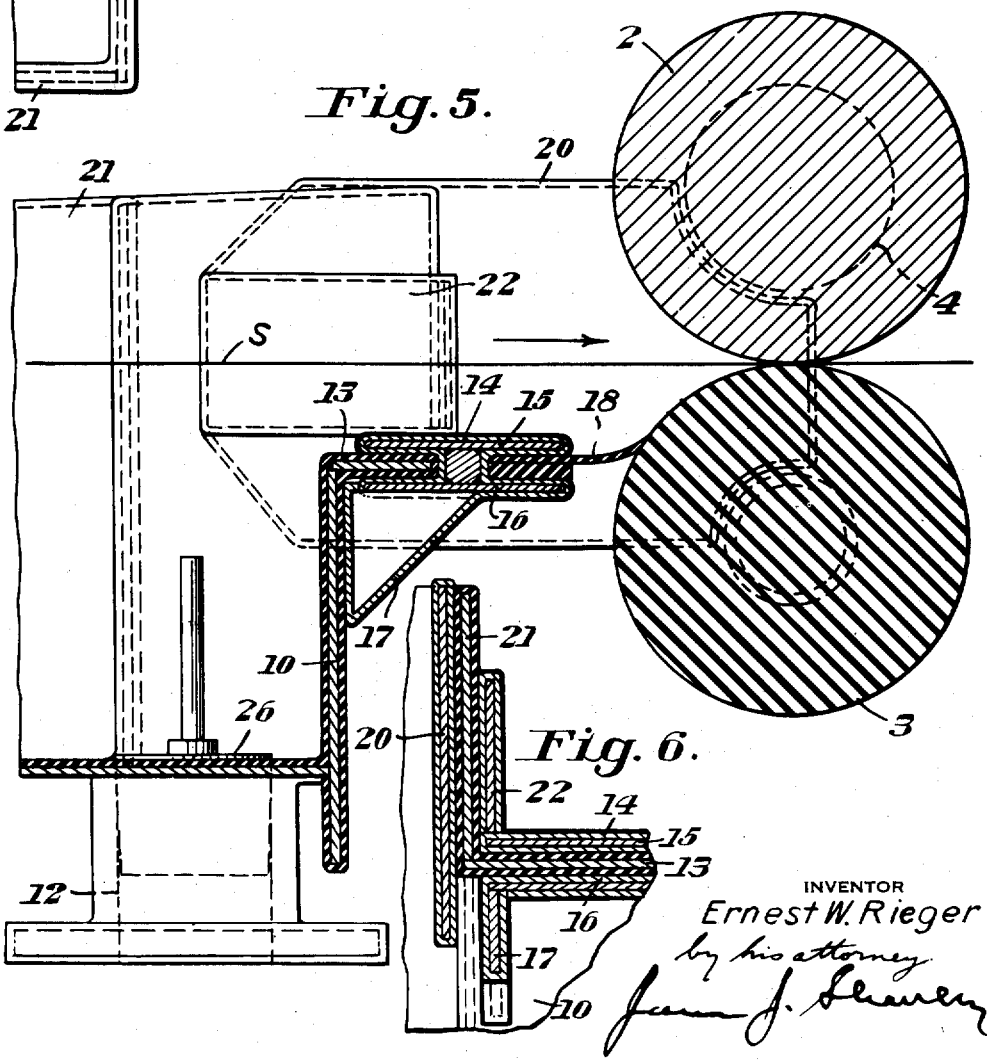
Fig. 6.
INVENTOR
Ernest W. Rieger
by his attorney
James J. Shavery Reissued Jan. 22, 1952 Re. 23,456

UNITED STATES PATENT OFFICE 23,456

APPARATUS FOR ELECTROCOATING STRIPLIKE MATERIAL

Ernest W. Rieger, Bloomingdale, Ohio, assignor to National Steel Corporation, a corporation of Delaware Original No. 2,569,578, dated October 2, 1951, Serial No. 548,406, August 7, 1944. Application for reissue November 5, 1951, Serial No. 254,820

6 Claims. (Cl. 204—206)

Matter enclosed in heavy brackets [ ] appears in the original patent but forms no part of this reissue specification; matter printed in italics indicates the additions made by reissue.

The present invention relates to the electrocoating of strip-like material, and more particularly to the coating line where the electro-deposited metal is applied to the base material. My invention is particularly applicable to the manufacture of tinplate by the electrolytic process and will be so described herein. However, it will readily be apparent to those skilled in this art that my invention may be applied in the electrogalvanizing of strip or in other processes wherein a base metal is coated with another metal by an electro-deposition process.

Several different processes of manufacturing tinplate by the electrolytic method have been employed heretofore. In one process employed commercially the strip is continuously fed through a bath in which bars of tin are suspended, the strip being passed vertically upwardly and then downwardly past the tin bars which form the anodes of the electric circuit. In this process the strip is simultaneously coated with tin on both sides. In another process which has been used heretofore commercially, the strip is passed continuously through one series of tanks or cells containing the tin anode bars and the strip coated on one side only. In this process, the strip is then passed through a second series of plating cells in which the other side is similarly coated. My invention is particularly applicable to this latter process, due to the fact that there is an appreciably greater amount of the electrolyte carried from the plating cells by the strip in this process than in the process in which the strip is passed vertically upwardly and downwardly in the bath and simultaneously coated on both sides. However the principles of my invention are applicable to and may be employed in either type of process.

In the process in which the strip is coated first on one side and then on the other side, the strip passes successively through a series of plating tanks or cells. Each plating cell has in it a plurality of tin anode bars which are immersed in the electrolyte. The strip passes through each cell above the anode bars and substantially at but nevertheless slightly below the surface of the electrolyte bath contained in the cell. The strip forms the cathode of the electric circuit and passes between a contact roll and a backing roll on the strip entry end of each cell.

Due to the fact that the electrolyte must come in contact with the strip as it passes through each cell, there is a constant outflow of the electrolyte from the cell regardless of the speed at which the strip passes therethrough. Some circulation of the electrolyte from the cells to a storage tank and from the storage tank back to the cells is desirable in order to obtain uniformity in the deposition of the tin on the strip. However as will be pointed out hereinafter, excessive circulation is highly undesirable for various reasons.

The strip, in normal operations, passes through the plating cells at a relatively high rate of speed. The speeds normally employed are in the neighborhood of 500 to 1000 or more feet per minute. Where such speeds are employed the strip, due to its forward motion, drags or carries with it a substantial amount of the electrolyte and causes it to discharge from each cell at the strip discharge end thereof. The strip discharge end of each cell is normally open from a point below the surface of the electrolyte bath and consequently there is normally some flow of the electrolyte from the tank at this point. However, where speeds such as those mentioned above are employed, this normal spillage is supplemented by the amount dragged forward by the strip and is objectionably large for several reasons. The discharged electrolyte is deposited in trays positioned below the cells and from each tray it is carried to the storage tank for recirculation through the cells.

It has been the practice heretofore to allow the electrolyte to flow over the sides of each plating cell and also over the strip entry end as well as over the strip discharge end. Due to the substantial nature of this spillage an extremely high pumping rate has been required in order to maintain a proper amount of the electrolyte in each cell. Where a high circulation rate is required as a result of the substantial spillage of the electrolyte from each cell, objectionable aeration of the electrolyte is encountered. The aeration of the electrolyte results in the conversion of stannous chloride in the electrolyte to the relatively insoluble stannic chloride. As a consequence, a sludge is formed in the plating cells and in the storage tank and recirculating apparatus. Where a high degree of aeration is encountered, a high rate of sludge formation is likewise encountered. Tests have shown that the rate of sludge formation is substantially directly proportional to the pumping rate required to replenish the electrolyte discharged from the cells by spillage.

Aeration of the electrolyte is caused by several different factors. Where the strip pulls the electrolyte from the cells at a relatively high rate, the discharged electrolyte strikes the liquid surface in the tray positioned below the cells and considerable aeration takes place at this point. This electrolyte is discharged from the trays through conduits and at the point where the electrolyte enters each conduit there is a substantial amount of turbulence which results in aeration of the liquid. Some of the electrolyte is discharged over the sides of the cells and if this discharge is at a relatively low rate and the liquid falls into the trays in the form of a film, only a small amount of aeration takes place. However, frequently the liquid cascades downwardly over the sides of the cells and an appreciable amount of aeration takes place. This is particularly true adjacent the strip discharge end of each cell.

In accordance with the present invention I provide apparatus appreciably reducing the aeration of the electrolyte and the pumping rate required to keep the cells supplied with the electrolyte. In the apparatus which I provide discharge of the electrolyte over the sides of each cell is eliminated as the sides extend upwardly from the bottom wall to above the level of the electrolyte under normal operating conditions. The flow of the electrolyte from each cell is in a direction opposite to the direction of travel of the strip and is discharged over an end wall or weir at the strip entry end of the cell. The body of the electrolyte has a quiescent level above the plane of the strip when the strip is stationary during non-operating periods. This quiescent level is also above the end wall or weir at the entry end of the cell or tank. The electrolyte is dragged along in the direction of travel of the strip by the strip during operating periods and in order to prevent discharge of any substantial amount of the electrolyte from the strip discharge end of the tank a dam is provided. The dam includes an electrical current strip contact roll and a pressure roll which is utilized to press the strip into engagement with the contact roll. The roll pass formed by the rolls is in substantially the same horizontal plane as that in which the strip lies during its passage through the tank. This plane, as is stated above, is below the quiescent level of the electrolyte. The dam also includes sealing means extending between the walls of the tank or cell at the discharge end and the rolls and in this manner any substantial discharge of electrolyte at the discharge end of the cell is eliminated. With this arrangement electrolyte is discharged from each cell only at the strip entry end, except for the small amount of leakage which will normally take place at the strip discharge end. However, the amount discharged at the strip entry end is only a small fraction of that discharged from each cell in the presently known types of apparatus and, as a consequence, aeration of the electrolyte is minimized, the pumping rate required to keep the proper amount of electrolyte in each cell is reduced and the sludge-forming rate is also reduced. Thus substantial savings in operating costs are effected.

In the accompanying drawings, I have shown, for purposes of illustration only, a preferred embodiment of my invention. In the drawings, Figure 1 is a plan view of a portion of an electro-coating line embodying my invention;

Figure 4 is a plan view of a portion of the apparatus shown in Figure 1 adjacent the strip discharge end of the cell;

Figure 5 is an enlarged sectional view showing a portion of the apparatus adjacent the strip discharge end of the cell; and Figure 6 is a partial sectional view taken along the line VI—VI of Figure 4.

Figure 1:
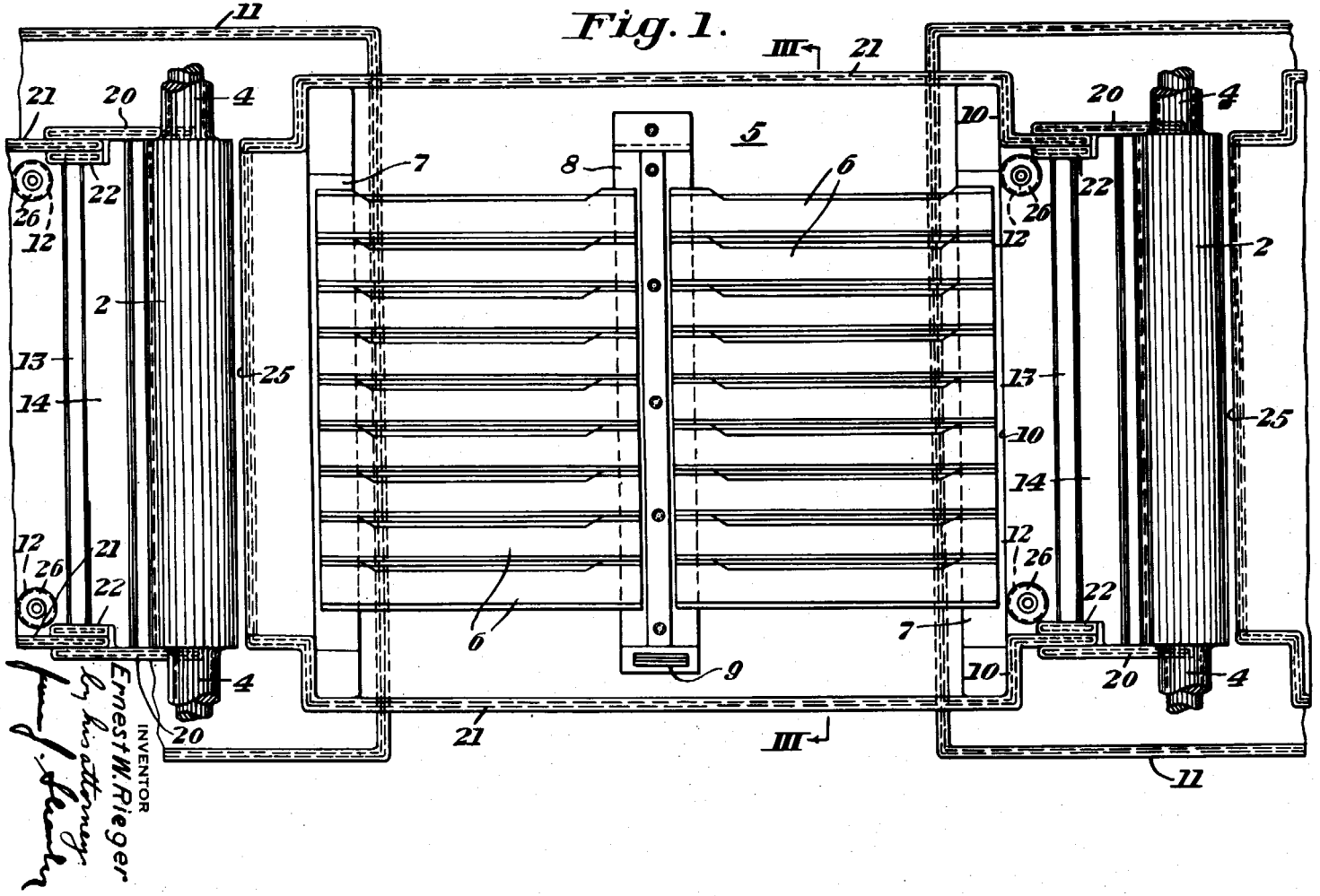
Figure 2:
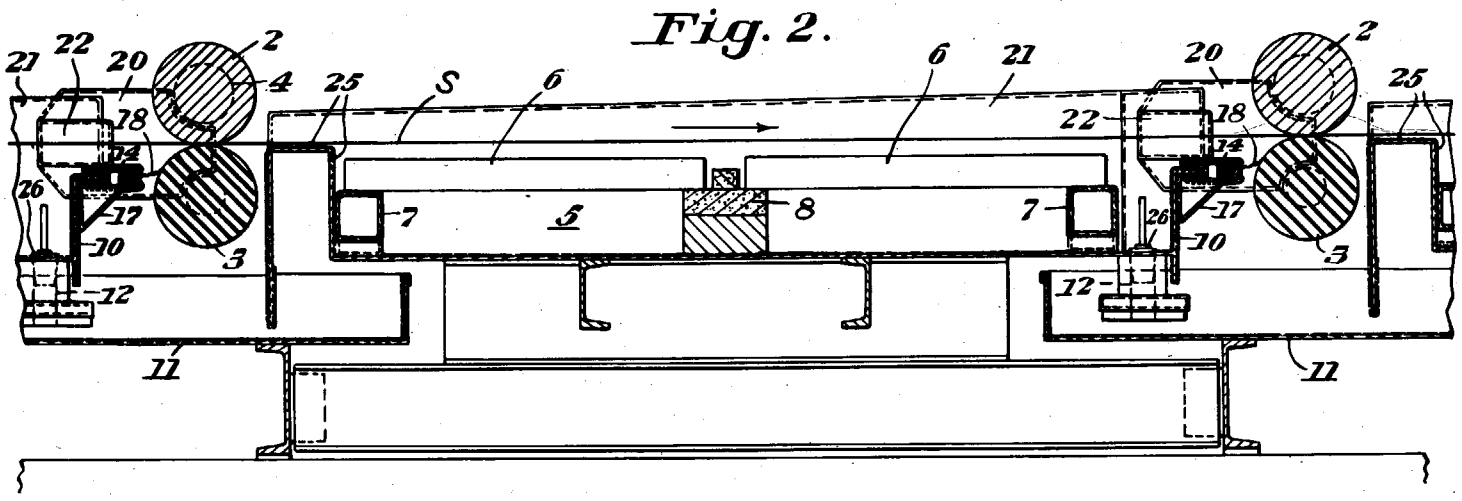
Figure 2 is a central, vertical longitudinal section through the apparatus shown in Figure 1.

In the aparatus shown in the drawings, the strip S passes from the immediately preceding cell or, in the case of the first cell in the line, from the pretreating apparatus between a pair of rolls comprising a contact roll 2 and a backing roll 3. These rolls are positioned at the strip entry end of the initial cell in the line and are positioned between each of the cells in the line. The contact roll 2 is provided with necks 4 which cooperate with electrical apparatus (not shown) forming a part of the electrical circuit. The roll 3 is merely a backing roll and is ordinarily formed of hard rubber.

Figure 3:
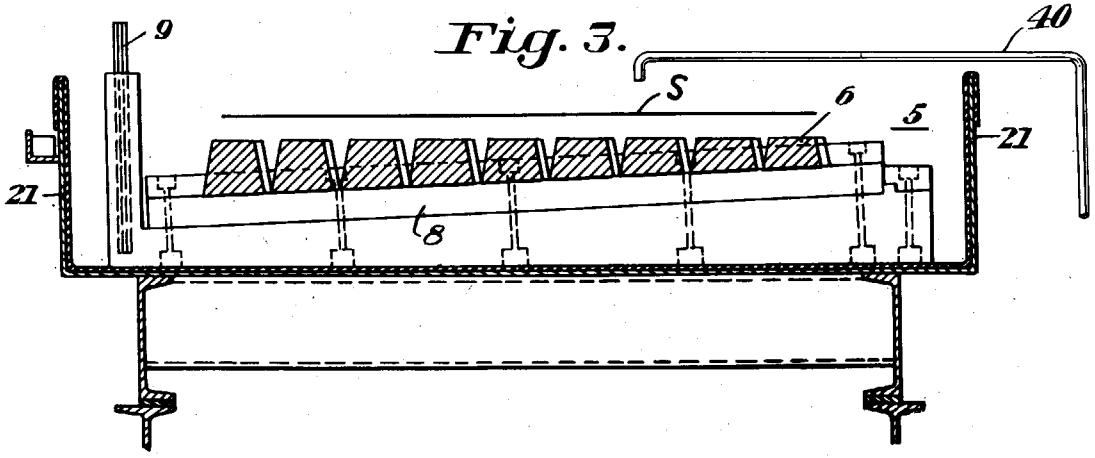
Figure 3 is a transverse vertical section taken along the line III—III of Figure 1.

After the strip passes between the rolls 2 and 3, it passes into the plating cell which is indicated generally by the reference character 5. The cell 5 contains a plurality of anode bars 6 of tin. One end of each anode bar is supported on an insulated member 7 and the other end is supported on a carbon block 8 which forms a part of the electrical circuit. The carbon block, at one side of the cell, is provided with bars 9 which are connected to electrical apparatus for supplying current to the system. The cell 5 contains the electrolyte bath, the level of which is normally slightly above the level of the strip. The electrolyte is fed to the cell either by a conduit opening through the bottom of the cell or by a pipe or hose 40 (Fig. 3) located above the strip level and arranged to discharge the electrolyte onto the surface of the strip, or in both ways. I have found that it is desirable to supply the electrolyte in the latter way because it results in covering the top surface of the strip with the electrolyte. If this is not done, the tinning of the top surface in later operations is not uniform.

As the strip passes through the cell, tin is deposited from the anode bars 6 onto the strip. The strip passes from the cell at the end opposite the entry end and passes between the contact roll 2 and the backing roll 3 adjacent the strip entry end of the next preceding cell.

Reference is hereby made to the copending application of Clarence J. Klein, Serial No. 523,681 filed February 24, 1944, now Patent Number 2,509,304, for a more complete description of a tinning line of the general type described above.

As stated above, the strip carries a substantial portion of the electrolyte forwardly through the cell, and, in the absence of means for preventing it the electrolyte flows over the end wall 10 at the strip discharge end of the cell and is deposited in a tray 11 which extends beneath the discharge end of one cell and the entry end of the next succeeding cell. Also some of the electrolyte is normally withdrawn from the cell at the discharge end thereof through downcomers 12 which discharge the electrolyte into the tray 11.

In accordance with my invention, provision is made to substantially eliminate the discharge of the electrolyte over the end wall 10 of the cell and over the side walls 21. The end wall 10 has a horizontal portion 13 which carries an extension member 14 which partially bridges the area between the end wall of the cell and the backing roll 3. The extension 14 comprises a top plate 15 and a bottom plate 16 and a supporting member 17, all of which are either covered with a heavy layer of rubber or some other material which is resistant to the action of the electrolyte or painted with a thin coating of rubber or some other similar material.

The extension 14 does not completely bridge the space between the end wall 10 and the backing roll 3. However the extension carries a resilient bridging member 18 which extends forwardly into contact with the backing roll. This resilient bridging member is preferably made of good quality natural or synthetic rubber which will resist the action of the electrolyte and which will withstand the wear of the rotating roll 3. The extension 14 and the resilient bridging member 18 completely bridge the area from the end wall 10 to the backing roll 3 so that electrolyte cannot flow downwardly over the end wall into the collecting tray [10]*11*.

In order to prevent the electrolyte from flowing sidewise adjacent the rolls 2 and 3, side plates or members 20 are provided. Each side plate 20 constitutes an extension of a side wall 21 of the cell. Each side plate 20 has an arm 22 which extends generally parallel to the plate 20 and is joined to the plate to form a section fitting over the end of the adjacent side wall of the cell. The plate 20, the arm 22 and the side wall 21 are all preferably formed of sheet metal provided with a heavy layer of rubber. In fact, all of the part of the apparatus coming in contact with the electrolyte, except those parts necessary to the establishment of the electrical circuit, are coated with rubber or some similar material which is resistant to the electrolyte. Each side plate 21 extends forwardly toward the rolls 2 and 3. The forward end of each plate 20 is cut away to accommodate the necks of the rolls. The front end of each plate 20 preferably extends to or slightly beyond the axis of the rolls.

Heretofore in electro-tinning lines of the character illustrated in the drawings, the sides 21 of each cell extended upwardly slightly above the walls at the strip entry and discharge ends. As a consequence, considerable spillage took place over the side walls near the exit end and troughs were provided for collecting this spillage. In accordance with my invention the sides 21 are extended upwardly beyond the end wall 25 at the strip entry end and of course higher than the end wall 10 at the strip discharge end of the cell. At the strip entry end, the side walls are sufficiently high to preclude any spillage of the electrolyte thereover. At the other end of the cell these walls must be somewhat higher in view of the fact that the strip pulls the electrolyte through the cell and causes it to pile up to an appreciable extent ahead of the rolls 2 and 3. The side walls 21 need not extend vertically quite as high as the extension side plates 20 in view of the fact that the electrolyte build-up is highest immediately in front of the rolls.

The side walls 21, the side plates 20, the extension member 14, and the resilient bridging member 18 prevent sidewise spillage of the electrolyte and also prevent any substantial amount of the electrolyte from being discharged from the strip discharge end of the cell into tray 11. The side plates 20 and members 14 and 18 cooperate with rolls 2 and 3 to form in effect a dam preventing the dragging of electrolyte therebeyond. Of course all leakage at this end of the cell cannot be prevented in view of the fact that leakproof joints cannot be provided between side plates 20 and the necks of the rolls 2 and 3 but this leakage is extremely small and is of no consequence where the apparatus just described is employed.

In view of the fact that spillage over the strip discharge end of the cell is prevented and in view of the fact that sidewise spillage is prevented, the electrolyte flows rearwardly through the cell and is discharged over the end wall 25. The end wall 25 is in the shape of an inverted U, the one leg of the U extending downwardly to a short distance above the bottom of the tray [10] *11* so that there will be a minimum amount of aeration of the electrolyte at this point. If the electrolyte were permitted to spill into the tray [10] *11* from approximately the strip level considerable aeration would take place at this point.

Where the apparatus just described is employed, it is not necessary, and in most cases it is undesirable, to withdraw any portion of the electrolyte from the cell through the downcomers 12. As a consequence these downcomers are normally closed by plug valves 26 in normal operations. However if desired a small amount of the electrolyte may be continuously withdrawn from the cell through these downcomers.

As stated above, where apparatus of the character just described is employed, aeration is reduced to a minimum, the pumping rate is reduced to a small fraction of what would be required without my improvements and sludge formation is reduced appreciably. As a consequence, operating costs are materially reduced and a more efficient, high speed tinning line is provided.

While I have shown and described a preferred embodiment of my invention, it will be understood that my invention is not limited thereto but may be otherwise embodied within the scope of the appended claims.

I claim:

1. In apparatus for progressively electroplating strip, the combination comprising, a tank for holding a bath of electroplating solution, means for moving the strip along a horizontal path across the tank from the entry end to the exit end whereby the moving strip drags electroplating solution in the direction of strip travel, means for supplying electroplating solution to the tank, an electroplating anode disposed in said tank below the path of the strip, said tank having a bottom wall, side walls extending upwardly from the bottom wall above the path of the strip across the tank for preventing spillage of electroplating solution across the side walls, an entry end wall extending upwardly from the bottom wall toward the path of the strip and terminating below the path of the strip and below the side walls, said tank being free of means preventing the spillage of solution across the top of the entry end wall and said entry end wall forming a discharge weir for the solution at the entrance end of the tank, and an exit end wall at the exit end of the tank extending upwardly from the bottom wall toward the path of the strip, said strip moving means comprising a pair of strip engaging rolls including an upper roll and a lower roll adjacent the discharge end of and positioned outside of the tank, one of said rolls being a contact roll for making electrical contact with the strip, means for connecting the contact roll and the anode to a source of electric current, sealing means extending between each of the side walls of the tank and the rolls and sealing means extending between at least one of the rolls and the exit end wall of the tank, the sealing means with the rolls preventing the spillage of electroplating solution from the exit end of the tank so that substantially all of the spillage of electroplating solution from the tank is across the entry end wall in a direction countercurrent to the direction of strip movement across the tank, and means [extending beneath] *at* the entry end of the tank for collecting the electroplating solution spilling over the entry end wall of the tank.

2. In apparatus for progressively electroplating strip, the combination comprising, a tank for holding a bath of electroplating solution, means for moving the strip along a horizontal path across the tank from the entry end to the exit end whereby the moving strip drags electroplating solution in the direction of strip travel, means for supplying electroplating solution to the tank, an electroplating anode disposed in said tank below the path of the strip, said tank having a bottom wall, side walls extending upwardly from the bottom wall above the path of the strip across the tank for preventing spillage of electroplating solution across the side walls, an entry end wall extending upwardly from the bottom wall toward the path of the strip and terminating below the path of the strip and below the side walls, said tank being free of means preventing the spillage of solution across the top of the entry end wall and said entry end wall forming a discharge weir for the solution at the entrance end of the tank, and an exit end wall at the exit end of the tank extending upwardly from the bottom wall toward the path of the strip, said strip moving means comprising a pair of strip engaging rolls including an upper roll and a lower roll adjacent the discharge end of and positioned outside of the tank, one of said rolls being a contact roll for making electrical contact with the strip and each of said rolls having at each end a relatively smaller roll neck, means for connecting the contact roll and the anode to a source of electric current, a side wall extension for each side wall and having demountable sealing connection therewith and extending forwardly to the lower roll and being cut away at the forward end to engage the periphery of the corresponding roll neck of the lower roll, and sealing means extending from the said exit end wall of the tank to said lower roll which together with said side wall extensions form a container for holding the plating solution and for restraining the spillage of electroplating solution from the exit end of the tank so that substantially all of the spillage of electroplating solution from the tank is across the entry end wall in a direction countercurrent to the direction of strip movement across the tank, and means [extending beneath] *at* the entry end of the tank for collecting the electroplating solution spilling over the entry end wall of the tank.

3. In apparatus for progressively electroplating strip, the combination comprising, a tank for holding a bath of electroplating solution, means for moving the strip along a horizontal path across the tank from the entry end to the exit end whereby the moving strip drags electroplating solution in the direction of strip travel, means for supplying electroplating solution to the tank, an electroplating anode disposed in said tank below the path of the strip, said tank having a bottom wall, side walls extending upwardly from the bottom wall above the path of the strip across the tank for preventing spillage of electroplating solution across the side walls, an entry end wall extending upwardly from the bottom wall toward the path of the strip and terminating below the path of the strip and below the side walls, said tank being free of means preventing the spillage of solution across the top of the entry end wall and said entry end wall forming a discharge weir for the solution at the entrance end of the tank, and an exit end wall at the exit end of the tank extending upwardly from the bottom wall toward the path of the strip, said strip moving means comprising a pair of strip engaging rolls including an upper roll and a lower roll adjacent the discharge end of and positioned outside of the tank, one of said rolls being a contact roll for making electrical contact with the strip and each of said rolls having at each end a relatively smaller roll neck, means for connecting the contact roll and the anode to a source of electric current, a side wall extension for each side wall and having demountable sealing connection therewith and extending forwardly into engagement with the ends of the rolls and being cut away at the forward end to engage the periphery of the corresponding roll necks with a portion at the forward end extending between the roll necks, and a sealing means extending from the said exit end wall of the tank to said lower roll which together with said side wall extensions form a container for holding the plating solution and for restraining the spillage of electroplating solution from the exit end of the tank so that substantially all of the spillage of electroplating solution from the tank is across the entry end wall in a direction countercurrent to the direction of strip movement across the tank, and means [extending beneath] *at* the entry end of the tank for collecting the electroplating solution spilling over the entry end wall of the tank.

4. In apparatus for progressively electroplating strip, the combination comprising, a tank for holding a bath of electroplating solution, means for moving the strip along a horizontal path across the tank from the entry end to the exit end whereby the moving strip drags electroplating solution in the direction of strip travel, means for supplying electroplating solution to the tank, an electroplating anode disposed in said tank below the path of the strip, said tank having a bottom wall, side walls extending upwardly from the bottom wall above the path of the strip across the tank for preventing spillage of electroplating solution across the side walls, an entry end wall extending upwardly from the bottom wall toward the path of the strip and terminating below the path of the strip and below the side walls, said tank being free of means preventing the spillage of solution across the top of the entry end wall and said entry end wall forming a discharge weir for the solution at the entrance end of the tank, and an exit end wall at the exit end of the tank extending upwardly from the bottom wall toward the path of the strip, said strip moving means comprising a pair of strip engaging rolls including an upper roll and a lower roll adjacent the discharge end of and positioned outside of the tank, one of said rolls being a contact roll for making electrical contact with the strip, means for connecting the contact roll and the anode to a source of electric current, a side wall extension for each side wall, each side wall extension including a member extending from the side wall forwardly to the lower roll and a parallel arm spaced from and joined at one end to the member, the member and arm fitting over the end of the corresponding side wall and forming a demountable connection therewith, and a sealing means extending from the exit end wall to said lower roll which together with said side wall extensions of the tank form a container for holding the plating solution and for restraining the spillage of electroplating solution from the exit end of the tank so that substantially all of the spillage of electroplating solution from the tank is across the entry end wall in a direction countercurrent to the direction of strip movement across the tank, and means [extending beneath] *at* the entry end of the tank for collecting the electroplating solution spilling over the entry end wall of the tank.

5. In apparatus for progressively electroplating strip, the combination comprising, a tank for holding a bath of electroplating solution, means for moving the strip along a horizontal path across the tank from the entry end to the exit end whereby the moving strip drags electroplating solution in the direction of strip travel, means for supplying electroplating solution to the tank, an electroplating anode disposed in said tank below the path of the strip, said tank having a bottom wall, side walls extending upwardly from the bottom wall above the path of the strip across the tank for preventing spillage of electroplating solution across the side walls, an entry end wall extending upwardly from the bottom wall toward the path of the strip and terminating below the path of the strip and below the side walls, said tank being free of means preventing the spillage of sqlution across the top of the entry end wall and said entry end wall forming a discharge weir for the solution at the entrance end of the tank, and an axit end wall at the exit end of the tank extending upwardly from the bottom wall toward the path of the strip, said strip moving means comprising a pair of strip engaging rolls including an upper roll and a lower roll adjacent the discharge end of and positioned outside of the tank, one of said rolls being a contact roll for making electrical contact with the strip, means for connecting the contact roll and the anode to a source of electric current, a side wall extension for each side wall, each side wall extension including a member extending from the side wall forwardly to and into engagement with the rolls and a parallel arm spaced from and joined at one end to the member, the member and arm fitting over the end of the corresponding side wall and forming a demountable connection therewith, and a sealing means extending from the exit end wall to said lower roll which together with said side wall extensions of the tank form a container for holding the plating solution and for restraining the spillage of electroplating solution from the exit end of the tank so that substantially all of the spillage of electroplating solution from the tank is across the entry end wall in a direction countercurrent to the direction of strip movement across the tank, and means [extending beneath] *at* the entry end of the tank for collecting the electroplating solution spilling over the entry end wall of the tank.

6. In apparatus for progressively electroplating strip, the combination comprising, a tank for holding a bath of electroplating solution, means for moving the strip along a horizontal path across the tank from the entry end to the exit end whereby the moving strip drags electroplating solution in the direction of strip travel, means for supplying electroplating solution to the tank, an electroplating anode disposed in said tank below the path of the strip, said tank having a bottom wall, side walls extending upwardly from the bottom wall above the path of the strip across the tank for preventing spillage of electroplating solution across the side walls, an entry end wall extending upwardly from the bottom wall toward the path of the strip and terminating below the path of the strip and below the side walls, said tank being free of means preventing the spillage of solution across the top of the entry end wall and said entry end wall forming a discharge weir for the solution at the entrance end of the tank, and an exit end wall at the exit end of the tank extending upwardly from the bottom wall toward the path of the strip, said strip moving means comprosing a pair of strip engaging rolls including an upper roll and a lower roll adjacent the discharge end of and positioned outside of the tank, one of said rolls being a contact roll for making electrical contact with the strip and each of said rolls having at each end a relatively smaller roll neck, means for connecting the contact roll and the anode to a source of electric current, a side wall extension for each side wall, each side wall extension including a member extending from the side wall forwardly to and into engagement with the ends of the rolls and being cut away at the forward end to engage the periphery of the corresponding roll necks with a portion at the forward end extending between the roll necks, and a parallel arm spaced from and joined at one end to the member, the member and arm fitting over the end of the corresponding side wall and forming a demountable connection therewith, and a sealing means extending from the exit end wall to said lower roll which together with said side wall extensions of the tank form a container for holding plating solution and for restraining the spillage of electroplating solution from the exit end of the tank so that substantially all of the spillage of electroplating solution from the tank is across the entry end wall in a direction countercurrent to the direction of strip movement across the tank, and means [extending beneath] *at* the entry end of the tank for collecting the electroplating solution spilling over the entry end wall of the tank.

ERNEST W. RIEGER.

REFERENCES CITED

The following references are of record in the file of this patent or the original patent:

UNITED STATES PATENTS

| Number | Name | Date |
|---|---|---|
| 1,191,386 | Battle | July 18, 1916 |
| 1,242,695 | Hood | Oct. 9, 1917 |
| 1,484,653 | Kirschner | Feb. 26, 1924 |
| 2,024,248 | Rafton | Dec. 17, 1935 |
| 2,093,238 | Domm | Sept. 14, 1937 |
| 2,271,736 | Hall | Feb. 3, 1942 |
| 2,307,928 | Hogaboom | Jan. 12, 1943 |
| 2,324,652 | Stoker | July 20, 1943 |
| 2,344,548 | Goetz | Mar. 21, 1944 |
| 2,377,550 | Hall | June 5, 1945 |
| 2,384,660 | Ward | Sept. 11, 1945 |
| 2,490,055 | Hoff | Dec. 6, 1949 |

FOREIGN PATENTS

| Number | Country | Date |
|---|---|---|
| 467,019 | Great Britain | June 9, 1937 |

OTHER REFERENCES

"Metal Finishing," February 1944, pages 77 to 79, article entitled "Electrotinning Steel Strip at Weirton Steel."